(12) United States Patent
Kalbag

(10) Patent No.: US 8,131,847 B2
(45) Date of Patent: Mar. 6, 2012

(54) MECHANISM TO DETECT RESTRICTED ACCESS VIA INTERNET HOTSPOT

(75) Inventor: Rohit Satish Kalbag, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 232 days.

(21) Appl. No.: 12/539,959

(22) Filed: Aug. 12, 2009

(65) Prior Publication Data
US 2011/0040867 A1 Feb. 17, 2011

(51) Int. Cl.
*G06F 15/173* (2006.01)

(52) U.S. Cl. ......... 709/224; 709/203; 709/223; 455/436

(58) Field of Classification Search ................. 709/216, 709/219, 223–224; 455/436
See application file for complete search history.

(56) References Cited

U.S. PATENT DOCUMENTS

| | | | |
|---|---|---|---|
| 6,636,894 B1 * | 10/2003 | Short et al. | 709/225 |
| 6,859,833 B2 * | 2/2005 | Kirsch et al. | 709/224 |
| 7,107,334 B1 * | 9/2006 | Shaffer et al. | 709/224 |
| 7,454,207 B2 * | 11/2008 | Gallagher et al. | 455/435.1 |
| 2001/0005857 A1 * | 6/2001 | Lazaridis et al. | 709/219 |
| 2003/0046335 A1 | 3/2003 | Doyle et al. | |
| 2007/0073868 A1 * | 3/2007 | Nelson et al. | 709/224 |
| 2007/0198709 A1 * | 8/2007 | Hawkinson et al. | 709/224 |
| 2008/0275980 A1 * | 11/2008 | Hansen | 709/224 |
| 2008/0301281 A1 * | 12/2008 | Wang et al. | 709/224 |
| 2009/0182842 A1 * | 7/2009 | Dutta et al. | 709/218 |
| 2010/0107225 A1 * | 4/2010 | Spencer et al. | 726/4 |
| 2010/0161730 A1 * | 6/2010 | Donzis et al. | 709/205 |
| 2011/0208866 A1 * | 8/2011 | Marmolejo-Meillon et al. | 709/227 |

FOREIGN PATENT DOCUMENTS
WO  WO2007/099414 A1  9/2007

OTHER PUBLICATIONS

Extended European Search Report Dated Nov. 29, 2010 in EP application No. 10008379.9-2413.

* cited by examiner

*Primary Examiner* — Asad M Nawaz
*Assistant Examiner* — Waseem Ashraf

(57) ABSTRACT

The disclosed wireless device automatically detects the redirection of its internet access via a wireless hotspot network. The exemplary device algorithm provides the flexibility to detect either or both of DNS redirection and HTTP redirection, as well as to automatically accommodate such internet redirection. The proposed algorithm allows a wireless device user to be alerted and account for internet redirection when such internet redirection is automatically detected upon entering service via a hotspot. Alternatively, the wireless device may attempt to automatically meet the hotspot requirements and complete the internet access through the hotspot.

24 Claims, 6 Drawing Sheets

MECHANISM TO DETECT RESTRICTED ACCESS VIA INTERNET HOTSPOT

TECHNICAL FIELD

The present subject matter relates to techniques and equipment to detect restricted access via internet hotspot networks, based on detecting internet access redirection when connected to a wireless hotspot network. The restricted access detection may be used to alert a wireless device user of restricted internet access and prompt the user to acquire full internet access.

BACKGROUND

In recent years, mobile wireless communications have become increasingly popular. While desktop computers remain a part of the same network for a substantial period of time, wireless devices such as laptops, personal digital assistants ("PDAs"), smartphones, cellphones, and other portable computers are designed to be transportable and connect to wireless LAN networks (hereinafter "wireless hotspot networks" or "hotspots") such as IEEE 802.11 ("WiFi") networks. Such hotspots frequently provide internet access to a wireless device user, and wireless device users may thus connect to hotspots for the purpose of attaining internet access. Hotspots are available in many public places, including airports, coffee shops, hotels, etc., and the financial cost of using hotspots is often low, and sometimes free.

A wireless device such as a smartphone or laptop may possess the ability to use both hotspots and cellular base stations to access the internet. For internet access, wireless devices may prefer hotspots over cellular base stations due to a lower financial cost and/or a faster connection. When a hotspot is available, a wireless device may switch its internet access connection from a cellular base station to the hotspot. The internet access switch may be automatic, and thus the wireless device user may not even be aware of the switch.

A wireless device user will likely desire to have as few problems and interruptions of internet access as possible. However, it is a common practice among hotspots to restrict internet access to a wireless device until after the wireless device user has performed a task, such as, for example, accepting the terms and conditions of hotspot use, paying a fee for internet access via the hotspot, installing programming, or performing some other form of authentication. Typically, after connecting to a hotspot and opening a web browser, a wireless device user may be instructed to perform such a task. Restriction until the task is performed is often based on redirecting a wireless device user's internet requests to a hotspot webpage. Such redirection commonly involves domain name system ("DNS") forwarding or hypertext transfer protocol ("HTTP") forwarding (the terms "forwarding" and "redirection" have the same or similar meanings in this document and are used interchangeably).

For example, U.S. Pat. No. 6,636,894 discloses a method for redirecting a computer user accessing a network. The method involves a gateway device receiving from the computer an HTTP request for a destination address and responding with an HTTP response corresponding to a login page.

Effects of hotspot redirection on wireless devices vary, but as it has become popular for wireless device applications to access the internet, negative effects can be significant. DNS redirection interferes with practically every wireless device application that accesses the internet, as it is uncommon for wireless device applications to directly request IP addresses without first performing a DNS resolution on a domain name. While HTTP redirection may only interfere with applications that request web (HTTP) content, in recent years the trend has been for applications to integrate web content. Such applications would be affected.

Effects may be particularly severe for wireless devices that switch between cellular base stations and hotspots for internet access. In such cases, a wireless device user may be unaware of the switch between internet access services, and may not know why the wireless device applications are not functioning properly.

Hence a need exists for automatically detecting internet access redirection of a wireless device, particularly via a hotspot. Further, a need exists for alerting a wireless device user of such redirection so the user may take appropriate actions.

SUMMARY

The teachings herein alleviate one or more of the above noted problems with the negative effects that internet redirection upon hotspot access has on a wireless device's applications and overall functionality.

An example of the concepts disclosed and discussed in more detail below may include a method of automatically detecting internet redirection. Such a method involves a wireless device automatically detecting when it has connected to a wireless LAN network, such as an internet hotspot network. Upon the detection of a hotspot network connection, a request is sent to an internet server through the hotspot network. The internet server chosen is a server known not to implement redirection. Data may be received from the hotspot network in response to this request. Based on a discrepancy between this response data and expected response data for the internet server, internet access redirection may be determined.

A more specific example of automatically detecting internet access redirection may include the detection of multiple types of internet access redirection. Such a method may include a step for a wireless device to automatically detect when it is has connected to a hotspot network. Upon detecting such a connection, a first type of internet redirection detection may be performed whether or not the hotspot network implements internet access redirection. If the first type of detection doesn't catch any redirection, a second type of internet redirection detection may be performed—again, whether or not the hotspot network implements internet access redirection. If neither of these types of detection catch internet redirection, it may be assumed that the hotspot network is not redirecting the internet access of the wireless device.

The first type of detection may be either the detection of DNS redirection or the detection of HTTP redirection, and the second type of detection would be the other of these two detection types. The detection of DNS redirection includes a step to request resolution of an internet name, such as a domain name, to an internet protocol ("IP") address. This request is sent via the hotspot network. After the IP address is received from the hotspot network in response to this request, reverse resolution of the IP address is requested. If there is a discrepancy between the domain name that the IP address reverse resolves back to and the original domain name, this may serve as the basis for determining that the hotspot network is using DNS internet redirection.

A number of forms of HTTP are known, and HTTP redirection and detection of that type of redirection may involve any form of HTTP. For example, the wireless hotspot network may implement redirection on regular HTTP in response to URLs which begin with "http," and/or the wireless hotspot network may implement redirection on the secure form of HTTP (Hyper Text Transfer Protocol Secure or "HTTPS"), in response to URLs which begin with "https." HTTPS essentially provides transport for HTTP over an encrypted link. Unless noted otherwise, references to "HTTP" herein are intended to encompass all forms of the protocol, including for example regular HTTP and HTTPS.

The detection of HTTP redirection includes a step to send an HTTP request for a web page through the hotspot network. The web page may be known to employ no redirection mechanisms. An HTTP response may be received in response to this HTTP request, and based on differences between this HTTP response and the expected HTTP response(s), it may be determined that the hotspot network is using HTTP redirection to redirect internet access of the wireless device.

More specifically, an HTTP request may be for an HTTP HEAD, and the HTTP response may include an HTTP status code and HTTP headers. A discrepancy between the received HTTP status code and expected HTTP status codes that do not indicate forwarding may indicate that the hotspot network is using HTTP redirection to redirect internet access of the wireless device. Otherwise, the received HTTP headers may be compared with an expected HTTP headers for the web page, and a discrepancy between these two sets of HTTP headers may also lead to the conclusion that the hotspot network is using HTTP redirection to redirect internet access of the wireless device.

If internet redirection is taking place, it may be desirable to allow a wireless device user to authenticate to the hotspot network in order to access the internet. Thus, based on determining that the hotspot network is redirecting internet access of the wireless device, a web browser may be opened on the wireless device. Since internet redirection is taking place, the web browser should automatically load the web page the hotspot network intends for user authentication.

The automatic detection of internet redirection as outlined above may be implemented as various combinations of method technologies, wireless device hardware and associated software (program instructions and lists). The software may be downloaded from system hardware connected to communicate with the wireless device directly or via the network(s). A software product includes at least one machine-readable medium and information carried by the medium. The information carried by the medium may be executable program code and data for the various lists, which enable a programmable wireless device to implement the automatic detection of internet redirection like those discussed in more detail below.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present teachings.

The various technologies disclosed herein relate to detecting internet access redirection of service for a wireless device. Redirection detection may ordinarily be in response to detecting a wireless device's connection to a wireless hotspot network ("hotspot"), such as, for example, an IEEE 802.11 ("WiFi") wireless network, or another wireless LAN network (but not a cellular base station). The redirection detection may provide the flexibility to use any redirection technique that involves a wireless device receiving information via the hotspot that is different than information expected to be received. Such a difference may serve as the basis for determining that a hotspot is redirecting internet access of the wireless device.

Figure 1:
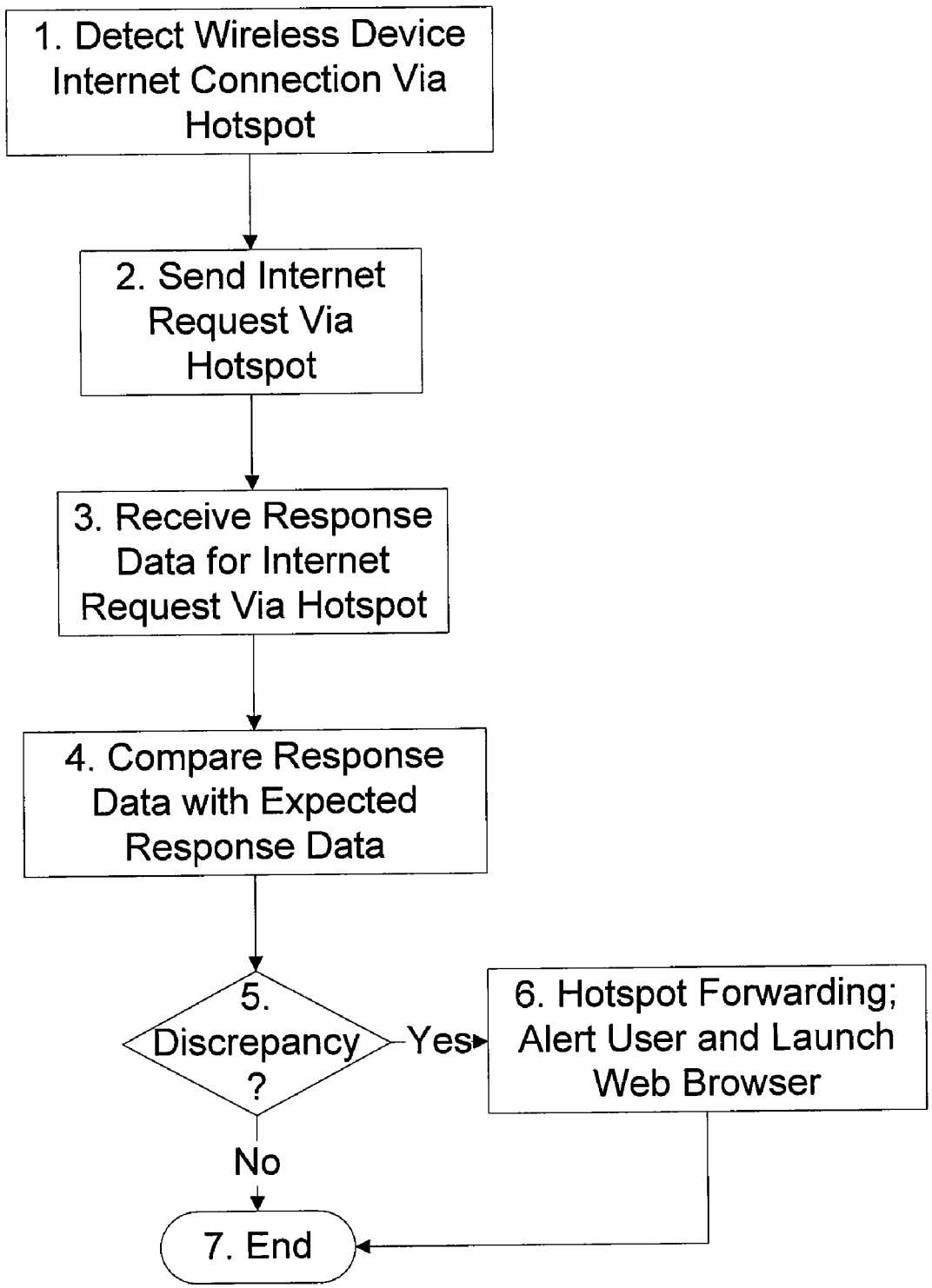
FIG. 1 is a high-level flow chart illustrating a method for detecting internet access redirection of a wireless device and announcing redirection detection to a wireless device user.

Reference now is made in detail to the examples illustrated in the accompanying drawings and discussed below. FIG. 1 is a flow chart that illustrates an example of a method for a wireless device to detect redirection of its internet access. At a high level, the wireless device detects a connection to a hotspot. In response, an internet request is sent and a response is received. The request is initially addressed to a source that does not implement redirection and for which the wireless device knows some or all of the response that the source is expected to send back. A comparison of the received response with the expected response may reveal that the response is unexpected or otherwise shows some indication of redirection. On this basis, it may be determined that internet access is being redirected. An alert then may be provided to the user to allow the user take appropriate action, e.g. to login to the hotspot network, or the wireless device may attempt to automatically respond to the access requirements of the hotspot.

With reference to the flow chart of FIG. 1, the following is an outline of the steps of an automatic internet redirection detection which may be performed by a wireless device. An exemplary system in which a wireless device may perform these steps is described later with regard to FIG. 2.

In FIG. 1 step 1, a wireless device may automatically detect connection to a hotspot such as a WiFi network or other wireless LAN network. In a typical application, the wireless device may connect to a hotspot in any number of places, including, for example, a hotel, an airport, or a coffee shop. The wireless device may detect a hotspot connection automatically so that the redirection detection process may be seamless for a wireless device user—for example, so that the wireless device user may not have to unexpectedly encounter the negative effects of hotspot redirection nor inform the wireless device of such a connection.

Automatic detection of a hotspot connection may exist in any wireless device with hotspot connection capabilities, such as a wireless device that has WiFi capabilities. A wireless device may also have an ability to connect to a cellular base station. For example, a smartphone may have the ability to connect to a cellular base station as well as the wireless access point of a WiFi hotspot network or system. However, automatic detection of internet redirection may be performed in wireless devices with or without cellular base station connection capabilities. For example, a laptop may not be able to connect to a cellular base station, but may still have the ability to connect to a hotspot. Automatic detection of internet redirection may still be performed in such a laptop. In a device such as a laptop or smartphone having both public cellular and wireless LAN communication capabilities, the wireless LAN detection and hotspot access redirection often occur as the device transitions from public cellular service to the wireless LAN service.

Internet redirection may commonly occur in many hotspots. Reasons for internet redirection may include requiring a wireless device user to pay a fee before using the hotspot, requiring a wireless device user to agree to the terms of service of the hotspot before using the hotspot, or merely requiring a wireless device user to log in or otherwise confirm identity.

In FIG. 1 step 2, in response to automatically detecting a connection to a hotspot, a wireless device may send an internet request via the hotspot. In one implementation, an internet request may be a request to resolve a domain name to an internet protocol ("IP") address. For example, the wireless device may send a request for a domain name server ("DNS") A-record on a domain name. In another implementation, an internet request may be a request to get all or a portion of a web page, for example, using HTTP. As noted earlier, the present concepts can detect redirection that utilizes any form of HTTP, including for example regular HTTP and HTTPS. The wireless device may have stored responses it expects for the web page. Stored responses may include a web page's header data, a web page's body data, and HTTP status codes. For example, the wireless device may send an HTTP HEAD for a web page in order to request the web page's header data and HTTP status code. As another example, the wireless device may send an HTTP GET for a web page in order to request the web page's header data, body data, and HTTP status code. An HTTP GET may, for example, be requested when it is suspected that javascript or another technology is being embedded in the body data of the web page to cause internet forwarding (redirection).

In FIG. 1 step 3, a response may be received via the hotspot in response to sending an internet request. In one implementation, the response may be an IP address. For example, an IP address may be the response if the internet request was to resolve a domain name to an IP address. In another implementation, the response may be HTTP data, such as an HTTP status code, HTTP headers of a web page, and/or the HTTP body of a web page. HTTP data may be the received response if the internet request was for HTTP data. An HTTP status code may typically be received regardless of what other HTTP data is received. Other HTTP data may depend on the sent HTTP request, and may include HTTP headers of a web page and/or the HTTP body of a web page.

In FIG. 1 step 4, the received response may be examined or compared with one or more pieces of data for at least one expected response. In one implementation, where the response is an IP address, a reverse resolution request may be sent to determine if the IP address actually corresponds with the domain name whose resolution was requested. For example, a wireless device may request a DNS PTR-record lookup on the received IP address. In another implementation, where the response is HTTP data, the HTTP status code may first be examined. The HTTP status code may be compared with expected HTTP status codes. Examples of expected HTTP status codes may include 2xx and 3xx HTTP status codes. A 3xx HTTP status code may indicate that HTTP forwarding is taking place. A 2xx HTTP status code may indicate that the HTTP headers should be examined and compared with expected HTTP headers for the web page. A 2xx HTTP status code may also indicate that the HTTP body (from an HTTP GET) should be examined and compared with an expected HTTP body for the web page. Comparison of both an HTTP HEAD and an HTTP GET response to the responses expected from the web page may be for an exact match, since it may be that the expected web page HTTP data should correspond exactly with the received HTTP data.

In FIG. 1 step 5, the results of comparing the received response to an expected response are used to determine if there is a discrepancy. A discrepancy may include a difference between the received response and an expected response, or it may simply be a comparison which results in a determination that the response, while expected, is not a response which indicates no forwarding is taking place. In one example, a discrepancy may exist where the domain name from a DNS PTR-record lookup on a received IP address is different from the expected IP address for the domain name originally requested to be resolved. In another example, a discrepancy may exist where the received HTTP status code is not 2xx, and/or where the received HTTP headers are different from the expected HTTP headers, and/or where the received response to the HTTP GET is different from the expected response to the HTTP GET. If a discrepancy exists, the wireless device shall go to FIG. 1 step 6. Otherwise, the wireless device shall go to FIG. 1 step 7.

In FIG. 1 step 6, the wireless device has determined that a discrepancy exists and, therefore, that the hotspot is redirecting internet access. At this step, the wireless device may, for example, choose to somehow alert the wireless device user of the internet redirection, or it may open a web browser so that the user is presented with the web page to which the hotspot is redirecting. In another example, the wireless device may attempt to automatically deal with the internet redirection by giving the required information to the hotspot by, for example, using HTTP protocol to communicate with the redirection web page and providing it the necessary information. Such information could be based on stored user data, or on previously-used data for the hotspot. When the wireless device has dealt with the internet redirection, it shall go to FIG. 1 step 7.

FIG. 1 step 7 indicates the end of an automatic internet redirection detection cycle. At this point, a wireless device user may access the internet freely with no redirection. However, a wireless device may make frequent internet connection switches from hotspot to hotspot, or from a hotspot to a cellular base station and back to a hotspot. Thus, from FIG. 1 step 7, a wireless device may go to FIG. 1 step 1 to repeat the internet redirection detection process. However, the wireless device may choose not to attempt to detect a connection to a hotspot (FIG. 1 step 1) until it has determined that the connection to the current hotspot is lost.

To appreciate the application of the above-discussed algorithm, it may be helpful to consider the context of an exemplary system in which internet redirection detection takes place.

Figure 2:
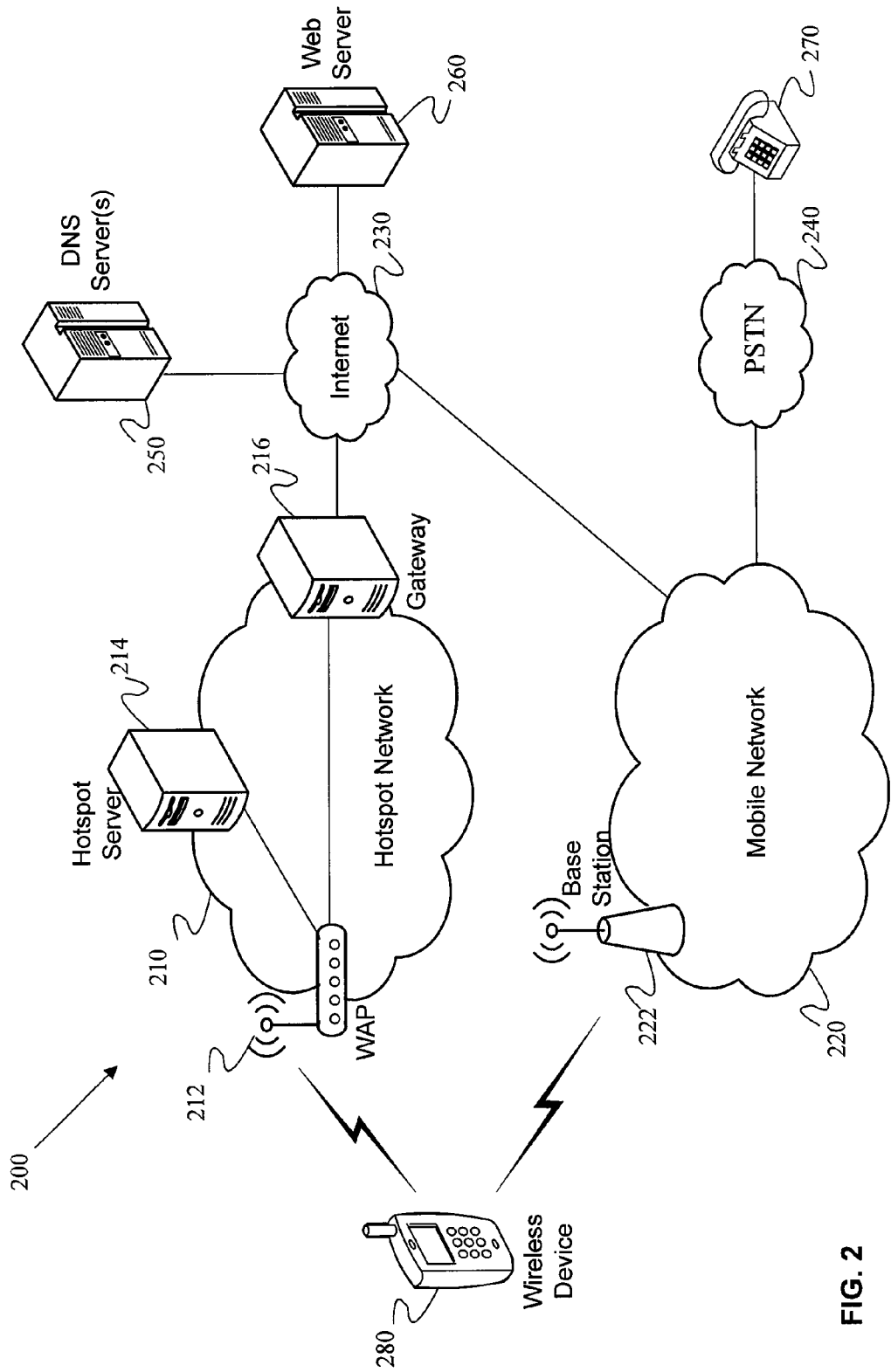
FIG. 2 is a high-level functional block diagram, useful in explaining hotspot networks, mobile cell stations, wireless devices, network elements and other components that may be involved in providing service(s) to a wireless device that is capable of automatically detecting internet access redirection via hotspot service for the wireless device.

FIG. 2 is a functional block diagram of an exemplary system 200 in which a method for automatically detecting hotspot internet redirection may be performed by a wireless device having both public wide area mobile (e.g. cellular) wireless communication capabilities and wireless local area network (e.g. WiFi) communication capabilities. System 200 includes any number of wireless devices, represented by, for example, a wireless device shown at 280 in the drawing. A wireless device 280 may be a laptop, a personal digital assistant ("PDA"), a smartphone, or another portable device designed to connect to wireless LAN networks such as hotspots similar to hotspot network 210. Wireless device 280 may also be designed to connect to a cellular mobile network, such as mobile network 220, via a cellular base station such as cellular base station 222. A user may use the wireless device 280 to access the internet 230, including accessing text and multimedia messages, e-mail, web browsing, programming and media downloading, etc. Based on its capabilities, to access the internet 230, wireless device 280 may switch between networks similar to hotspot network 210 and mobile network 220, or it may switch between networks similar only to hotspot network 210.

Internet 230 may refer to the public packet switched data communication network commonly referred to as the "Internet."

For discussion purposes, the exemplary system 200 shows two networks 210 and 220 operated in accord with different technology standards. Hotspot network 210 may include a wireless access point (WAP) 212 for wireless LAN communications with wireless device(s) 280. For example, WAP 212 may be a transceiver compatible with one or more current wireless standards, such as 802.11 (WiFi). WAP 212 may connect to a wired connection, such as an Ethernet network. WAP 212 may also function as a network switch for prioritizing traffic usage, or this function may be performed by a separate device (not separately shown). Although the drawing shows only one WAP 212, for convenience, those skilled in the art will recognize that actual implementations of the network 210 may include any number of additional WAPs.

Hotspot network 210 may also include a gateway 216. Gateway 216 may govern all communications traffic between WAP 212 and the internet 230. Hotspot network 210 may use gateway 216 to conduct authentication checks before a wireless device user may access the internet 230. Authentication may include entering billing information, other user identification information, an agreement to terms of service, etc. Gateway 216 may enforce authentication by, for example, restricting internet 230 access until the user authenticates. Internet 230 access restriction until the authentication task is performed may be based on redirecting the wireless device user's internet 230 requests to a hotspot web page such as a web page contained on hotspot server 214. To conduct such internet 230 redirection, gateway 216 may use may use domain name system ("DNS") forwarding, or it may use hypertext transfer protocol ("HTTP") forwarding.

If gateway 216 uses DNS forwarding, it may intercept domain name resolution requests sent by an unauthenticated wireless device to a DNS server 250 and return the IP address of, for example, an authentication web page as may be contained on hotspot server 214. In this manner, wireless device 280 may intentionally send internet 230 requests such as web page requests to web server 260 for news content, and thus may unintentionally receive the authentication web page from hotspot server 214 instead of the requested web page from internet 230.

In another DNS forwarding implementation which may or may not employ gateway 216 for DNS forwarding, wireless device 280 may request domain name resolution from hotspot server 214. For domain name resolution requests, hotspot server 214 may return the IP address of the authentication web page until the wireless device 280 authenticates, so that the user's internet 230 requests are similarly forwarded to the authentication web page until the device has successfully been authenticated.

Regardless of the DNS forwarding technique employed by hotspot network 210, until authenticating, many wireless device 280 applications may not work properly due the lack of notice concerning the internet 230 redirection.

Various techniques exist for hotspot network 210 to perform HTTP forwarding on wireless device 280. If gateway 216 uses HTTP forwarding, it may intercept HTTP protocol requests sent by wireless device 280 until wireless device 280 authenticates. In one example, gateway 216 may respond to HTTP requests with an HTTP response corresponding to an authentication web page. In another example, gateway 216 may retrieve and send to the wireless device the requested HTTP data, but with the addition of javascript or other technologies in the body of the HTTP data in order to carry out redirection to an authentication page. In still another example, gateway 216 may insert HTTP <META> tags into the requested HTTP data for the purpose of automatically refreshing the requested HTTP data to an authentication web page. In yet another example, which may be combined with previous examples, gateway 216 may send to wireless device 280 an HTTP forwarding status code. For example, gateway 216 may send a 302 status code, indicating temporary redirection.

With HTTP forwarding as with DNS forwarding, many wireless device 280 applications employing HTTP protocol may not work properly due to the lack of notice concerning the internet redirection.

Mobile network 220 may provide mobile telephone communications as well as Internet 230 services. For example, mobile network 220 may connect to the public switched telephone network (PSTN) 240 and public packet-switched data communication networks such as the Internet 230. Packet-switched communications via either hotspot network 210 or mobile network 220 may support a variety of services such as communications of text and multimedia messages, e-mail, web browsing, programming and media downloading, etc. System 200 shows a web server 260 by way of example. Wireless device 280 may connect to mobile network 220 through cellular base station 222.

Figure 3:
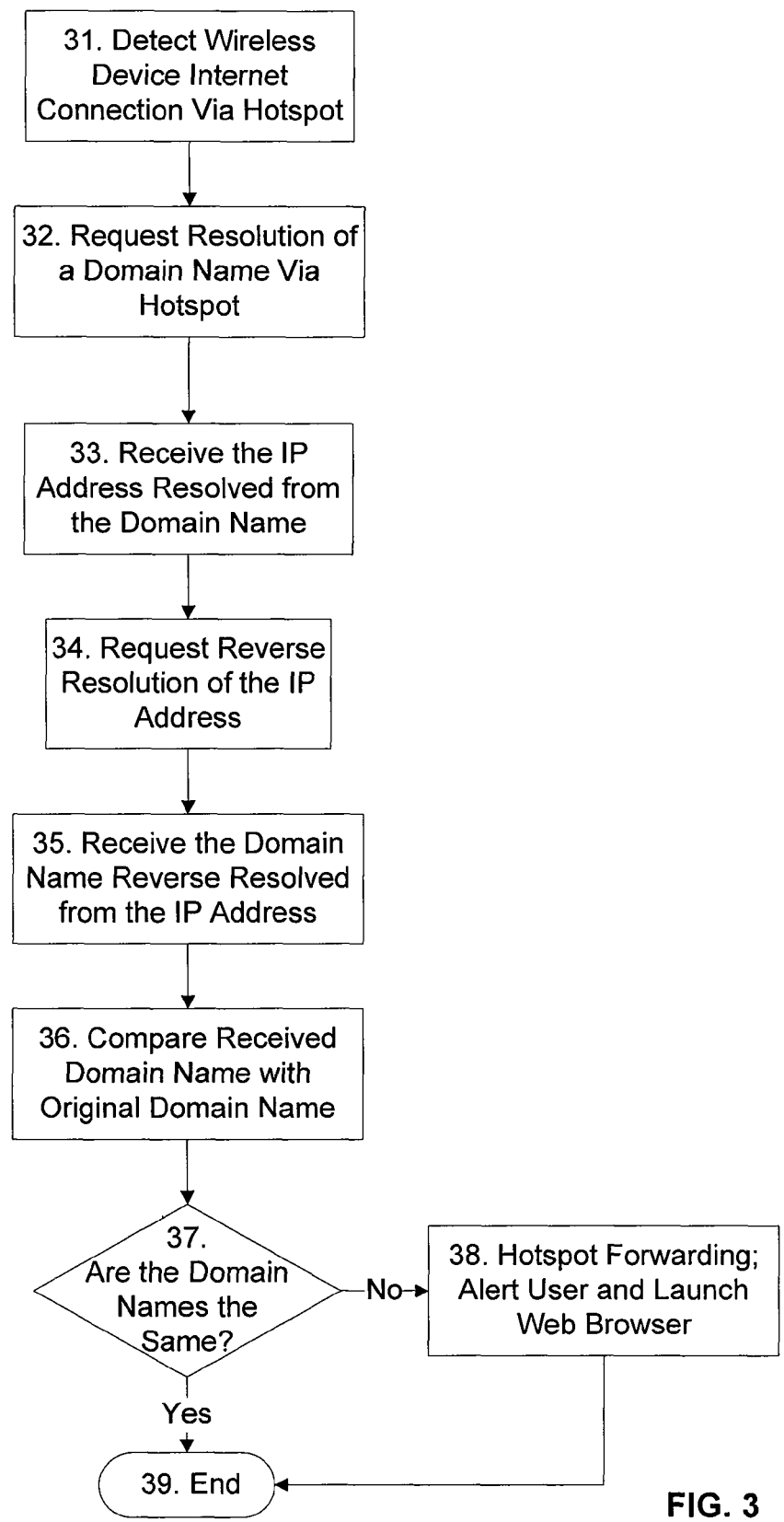
FIG. 3 is a flow chart illustrating a method for detecting internet access redirection of a wireless device, where the detection technique involves detecting DNS redirection and announces redirection detection to a wireless device user.

With reference to the flow chart of FIG. 3 and the exemplary system 200 of FIG. 2, the following is an outline of the steps of an automatic internet redirection detection which may be performed by a wireless device 280 in the exemplary system 200, where the detection technique involves detecting DNS redirection and announces redirection detection to the wireless device user.

In FIG. 3 step 31, the wireless device 280 automatically detects connection to hotspot network 210.

In FIG. 3 step 32, in response to automatically detecting the connection to hotspot network 210, the wireless device 280 sends a request, using the hotspot 210, to resolve a domain name to an IP address-for example, through sending a request for a DNS A-record on the domain name. This DNS resolution request may be sent to hotspot server 214, or it may be sent through the hotspot network to DNS server 250.

In FIG. 3 step 33, the wireless device 280 receives an IP address in response to requesting resolution of the domain name using hotspot network 210.

In FIG. 3 step 34, the wireless device 280 requests reverse resolution of the IP address, received in step 33, to determine if the IP address actually corresponds with the domain name whose resolution was requested. For example, wireless device 280 may request a DNS PTR-record lookup on the IP address. The reverse resolution request may be sent to hotspot server 214 or DNS server 250. Regardless of the server the reverse resolution request is sent to, the wireless device 280 may expect that it will receive an accurate reverse resolution of the IP address back to the domain name used in step 32.

In FIG. 3 step 35, the wireless device 280 receives a domain name from the reverse resolution request on the IP address.

In FIG. 3 step 36, the wireless device 280 compares the domain name received in FIG. 3 step 35 to the original domain name of FIG. 3 step 32. For example, the wireless device 280 may compare the domain names for sameness.

In FIG. 3 step 37, the wireless device 280 determines, based on the comparing of FIG. 3 step 36, whether or not the domain names are the same. If there is a discrepancy, that is to say, if the domain names are not the same, then the wireless device 280 shall go to FIG. 3 step 38. Otherwise, the wireless device 280 shall go to FIG. 3 step 39.

In FIG. 3 step 38, the wireless device 280 has determined that the domain names are not the same and, therefore, that the hotspot network 210 is redirecting internet access based on DNS redirection. At this step, to obtain internet access via the wireless hotspot network, the wireless device 280 may choose to somehow alert the wireless device user of the internet redirection, or it may attempt to automatically authenticate to the hotspot network 210. For example, the wireless device 280 may open a web browser so that the user is presented with the web page to which the hotspot is redirecting, and generate an alert to attract the user's attention. Generating the alert may involve playing an alert tone or carrying out any other attention-getting action (for example, vibrating, blinking, etc.). The browser presents the webpage, typically for obtaining internet access via the wireless hotspot network. The user may provide an input via the browser, and in response, the wireless devices submits via HTTP the needed action to obtain use of the hotpot, for example, to accept the terms and conditions. In an automatic mode, the device may pass stored or cached authentication information from a prior use of the hotpot. When the wireless device 280 has dealt with the DNS redirection, it shall go to FIG. 3 step 39.

Figure 4:
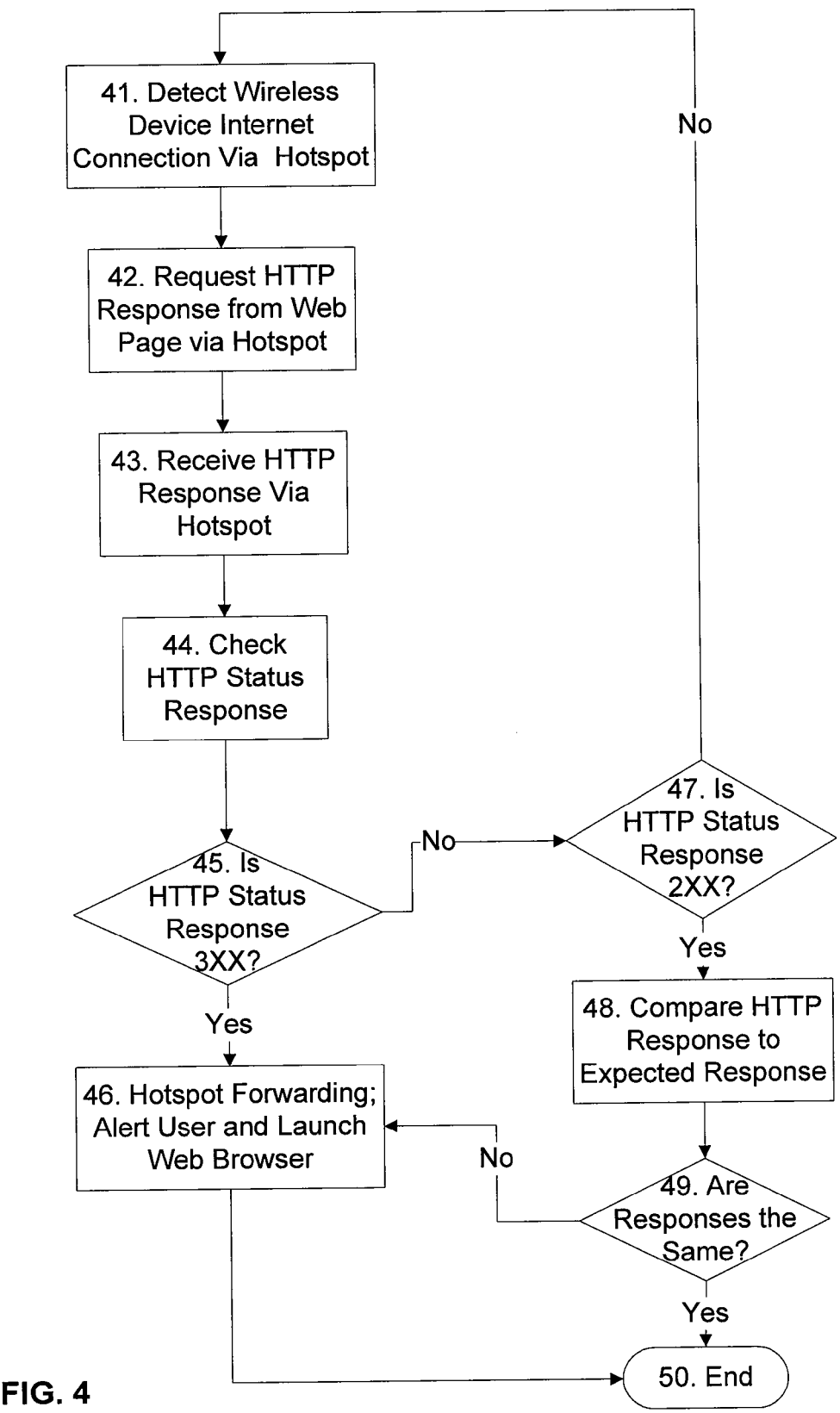
FIG. 4 is a flow chart illustrating a method for detecting internet access redirection of a wireless device, where the detection technique involves detecting HTTP redirection and announces redirection detection to a wireless device user.

FIG. 3 step 39 indicates the end of an automatic DNS redirection detection cycle. It is possible that at this point, a wireless device user may access the internet freely with no redirection. However, hotspot network 210 may still be employing HTTP redirection, and wireless device 280 should check for both HTTP and DNS redirection using the method of FIG. 5. FIG. 4 describes the method of detecting HTTP redirection in more detail.

Wireless device 280 may make frequent internet connection switches from hotspot to hotspot, or from a hotspot 210 to a cellular base station 220 and back to a hotspot. Thus, from FIG. 3 step 39, a wireless device may go to FIG. 3 step 31 to repeat the DNS redirection detection process. However, the wireless device may choose not to attempt to detect a connection to a hotspot (FIG. 3 step 31) until it has determined that the connection to the current hotspot is lost.

With reference to the flow chart of FIG. 4 and the exemplary system 200 of FIG. 2, the following is an outline of the steps of an automatic internet redirection detection which may be performed by a wireless device 280 in the exemplary system 200, where the detection technique involves detecting HTTP redirection and announces redirection detection to the wireless device user.

In FIG. 4 step 41, the wireless device 280 automatically detects connection to hotspot network 210.

In FIG. 4 step 42, in response to automatically detecting the connection to hotspot network 210, the wireless device 280 sends a request to web server 260, using the hotspot 210, to get an HTTP response for a web page whose data it may have stored. Stored responses may include the web page's header data, the web page's body data, and HTTP status codes. For example, the wireless device 280 may send to web server 260 an HTTP HEAD request for the web page in order to request the web page's header data and HTTP status code. As another example, the wireless device 280 may send to web server 260 an HTTP GET request for the web page in order to request the web page's header data, body data, and HTTP status code. An HTTP GET request may, for example, be requested when it is suspected that javascript or another technology is being embedded in the body data of the web page to cause internet forwarding (redirection).

In FIG. 4 step 43, the wireless device 280 receives an HTTP response via the hotspot network 210 in response to the HTTP request sent in step 42. The HTTP response may include an HTTP status code, supposed HTTP headers of the web page, and/or the supposed HTTP body of the web page. An HTTP status code may typically be received regardless of what other HTTP data is received. Other HTTP data may depend on the sent HTTP request (such as an HTTP GET request or an HTTP HEAD request).

In FIG. 4 step 44, the wireless device 280 checks the received HTTP status code against expected HTTP status codes. Examples of expected HTTP status codes may include 2xx and 3xx HTTP status codes.

In FIG. 4 step 45, the wireless device 280 determines if the received HTTP status code is in the 3xx range. A 3xx HTTP status code may directly indicate that HTTP forwarding is taking place. If the received HTTP status code is 3xx, the wireless device 280 shall go to FIG. 4 step 46. Otherwise, the wireless device 280 shall go to FIG. 4 step 47.

In FIG. 4 step 46, the wireless device 280 has determined that the hotspot network 210 is using HTTP redirection to redirect its internet access. At this step, the wireless device 280 may choose to somehow alert the wireless device user of the internet redirection, or it may open a web browser so that the user is presented with the web page to which the hotspot is redirecting, or it may attempt to automatically authenticate to the hotspot network 210 (in a manner similar to that described above relative to step 38 of FIG. 3). When the wireless device 280 has dealt with the HTTP redirection, it shall go to FIG. 4 step 50.

In FIG. 4 step 47, the wireless device 280 determines if the received HTTP status code is in the 2xx range. A 2xx HTTP status code may indicate that the HTTP header should be examined and compared with an expected HTTP header for the web page. A 2xx HTTP status code may also indicate that the HTTP body (from an HTTP GET) should be examined and compared with an expected HTTP body for the web page. Since the wireless device 280 has already checked for a 3xx HTTP status code in step 45, if the HTTP status code is also not 2xx, there may be other problems with the connection to the hotspot network 210, and the wireless device 280 shall to back to step 41. Otherwise, the wireless device 280 shall go to FIG. 4 step 48.

In FIG. 4 step 48, the wireless device 280 compares the rest of the received HTTP response (for e.g., HTTP headers and/or the HTTP body, depending on the HTTP request that was sent) to the HTTP response it expects for the web page. For example, the wireless device 280 may compare the received HTTP headers (from a sent HTTP HEAD request) to expected HTTP headers.

In FIG. 4 step 49, the wireless device 280 determines whether the received HTTP response is the same as the expected HTTP response. If the HTTP responses are not the same, wireless device 280 shall go to FIG. 4 step 46. Otherwise, wireless device 280 shall go to FIG. 4 step 50.

FIG. 4 step 50 indicates the end of an automatic HTTP redirection detection cycle. It is possible that at this point, a wireless device user may access the internet freely with no redirection. However, hotspot network 210 may still be employing DNS redirection, and wireless device 280 may check for and DNS redirection using the method of FIG. 5. FIG. 3 describes the method of detecting DNS redirection in more detail. DNS detection may precede HTTP detection, or HTTP detection may precede DNS detection.

Wireless device 280 may make frequent internet connection switches from hotspot to hotspot, or from a hotspot 210 to a cellular base station 220 and back to a hotspot. Thus, from FIG. 4 step 50, a wireless device may go to FIG. 4 step 41 to repeat the HTTP redirection detection process. However, the wireless device may choose not to attempt to detect a connection to a hotspot (FIG. 4 step 41) until it has determined that the connection to the current hotspot is lost.

Figure 5:
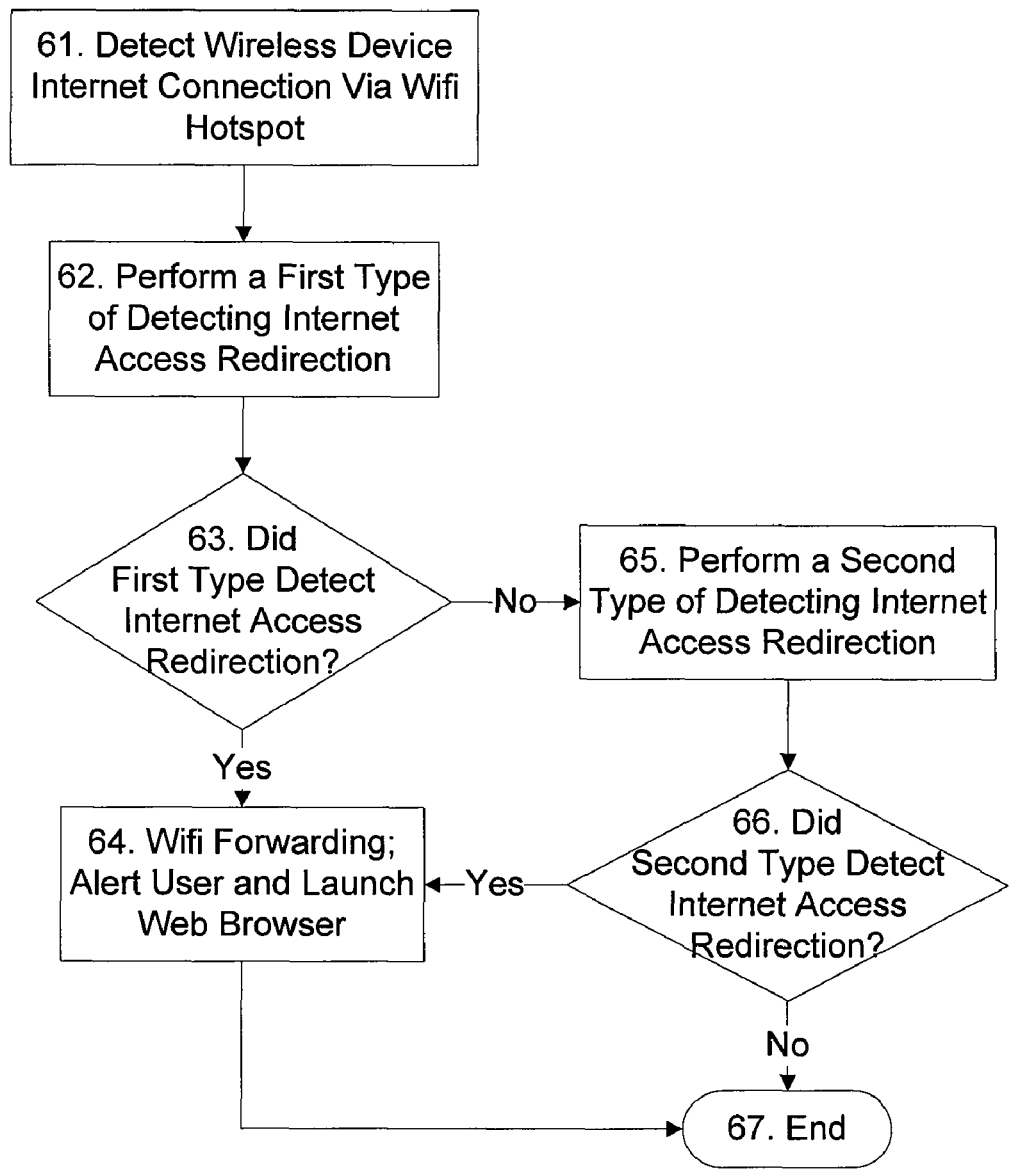
FIG. 5 is a flow chart illustrating a method for detecting internet access redirection of a wireless device, where the detection technique includes potentially detecting two types of redirection, and announces redirection detection to a wireless device user.

With reference to the flow chart of FIG. 5 and the exemplary system 200 of FIG. 2, the following is an outline of the steps of an automatic internet redirection detection which may be performed by a wireless device 280 in the exemplary system 200. The automatic internet redirection detection of FIG. 5 involves the potential detection of two types of internet access redirection.

In FIG. 5 step 61, the wireless device 280 automatically detects connection to hotspot network 210.

In FIG. 5 step 62, the wireless device 280 performs a first type of detecting whether hotspot network 210 is conducting internet access redirection. This first type of internet access redirection detection may detect, for example, HTTP redirection, or it may detect DNS redirection.

In FIG. 5 step 63, the wireless device 280 determines, based on the detecting of FIG. 5 step 62, whether hotspot network 210 is conducting the first type of internet access redirection. If so, the wireless device 280 shall go to FIG. 5 step 64. Otherwise, the wireless device 280 shall go to FIG. 5 step 65.

In FIG. 5 step 64, the wireless device 280 has determined that the hotspot network 210 is using the first or second type of internet access redirection to redirect its internet access. At this step, the wireless device 280 may choose to somehow alert the wireless device user of the internet redirection, or it may open a web browser so that the user is presented with the web page to which the hotspot is redirecting, or it may attempt to automatically authenticate to the hotspot network 210. When the wireless device 280 has dealt with the redirection, it shall go to FIG. 5 step 67.

If the first type of redirection was not detected at step 62, then the processing branches at step 63 to step 65. In FIG. 5 step 65, the wireless device 280 performs a second type of detecting whether hotspot network 210 is conducting internet access redirection. This second type of internet access redirection detection may detect a redirection technique not checked for by the first type of detection. For example, if the first type of detection checked for HTTP redirection, the second type of detection may check for DNS redirection. If the first type of detection checked for DNS redirection, the second type of detection may check for HTTP redirection.

In FIG. 5 step 66, the wireless device 280 determines, based on the detecting of FIG. 5 step 65, whether hotspot network 210 is conducting the second type of internet access redirection. If it is, the wireless device 280 shall go to FIG. 5 step 64. Otherwise, the wireless device 280 shall go to FIG. 5 step 67.

FIG. 5 step 67 indicates the end of an automatic redirection detection cycle. The cycle may have employed attempts to detect two types of redirection. At this point, a wireless device user may access the internet freely with no redirection. However, wireless device 280 may make frequent internet connection switches from hotspot to hotspot, or from a hotspot 210 to a cellular base station 220 and back to a hotspot. Thus, from FIG. 5 step 67, a wireless device may go to FIG. 5 step 61 to repeat the redirection detection process. However, the wireless device may choose not to attempt to detect a connection to a hotspot (FIG. 5 step 61) until it has determined that the connection to the current hotspot is lost.

Figure 6:
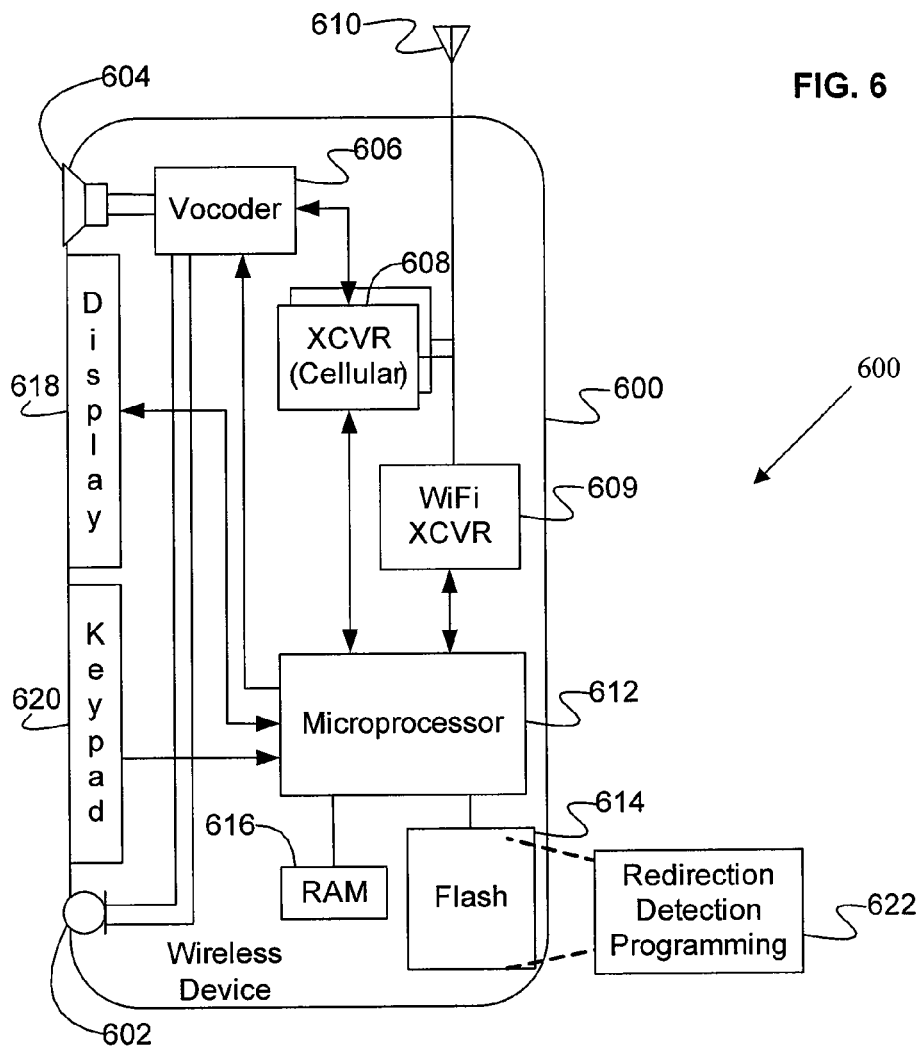
FIG. 6 is a high level functional block diagram of a wireless device, which may be configured to perform automatic internet redirection detection in accord with the procedures of FIGS. 1 and 3-5.

FIG. 6 provides a block diagram illustration of an exemplary wireless device 600, which may be the wireless device 280. Although the wireless device 600 may be a smart-phone or may be incorporated into another device, such as a portable personal computer, personal digital assistant (PDA), etc., for discussion purposes, the illustration shows the wireless device 600 in the form of a handset. The handset embodiment of the wireless device 600 functions as a normal digital wireless telephone station. For that function, the wireless device 600 includes a microphone 602 for audio signal input and a speaker 604 for audio signal output. The microphone 602 and speaker 604 connect to voice coding and decoding circuitry (vocoder) 606. For a voice telephone call, for example, the vocoder 606 provides two-way conversion between analog audio signals representing speech or other audio and digital samples at a compressed bit rate compatible with the digital protocol of wireless telephone network communications or voice over packet (internet protocol) communications.

For digital wireless communications, the wireless device 600 also includes at least one of digital transceivers ("XCVR") 608 and 609. The wireless device 600 is a multi-mode device capable of operations on various technology type networks, such as the networks 210 and 220. The concepts discussed here encompass embodiments of the wireless device 600 utilizing any digital transceivers that conform to current or future developed digital wireless communication standards.

In the example, the transceiver 608 is compatible with one or more standards of communication implemented in the public wide area mobile network 220, such as CDMA, 1xRTT, EvDO, LTE, GSM or UMTS. The transceiver 609 is compatible with one or more standards of communication implemented in wireless local area networks like network 210, such as one of the WiFi standards and/or WiMAX.

The transceiver 608 provides two-way wireless communication of information, such as vocoded speech samples and/or digital message information, in a selected one of the technology modes. The transceiver 608 also sends and receives a variety of signaling messages in support of the various voice and data services provided via the wireless device 600 and the communication network. Each transceiver 608 connects through radio frequency ("RF") send and receive amplifiers (not separately shown) to an antenna 610. In the example, the transceiver 608 is configured for RF communication in accord with a digital wireless protocol. For the network selection function, network communications via the transceiver 608 and antenna 610 may include detection of the available network technology types in any given service area and selection of an available network for communications.

The transceiver 609 also provides two-way wireless communication of information, such as vocoded speech samples and/or digital message information, in a selected one of the technology modes. The transceiver 609 sends and receives a variety of signaling messages in support of the various voice and data services provided via the wireless device 600 and the communication network. The transceiver 609 connects through RF send and receive amplifiers (not separately shown) to an antenna 610. In the example, transceiver 609 is configured for RF communications in accord with a wireless LAN protocol (a hotspot), such as WiFi. For the network selection function, network communications via the transceiver 609 and antenna 610 may include detection of the available wireless LAN technology types in any given service area and selection of an available network for communications. Wireless device 600 may use transceiver 609 to communicate with a hotspot network 210, and may use transceiver 608 to communicate with a mobile network 220. Since the transceiver 609 may connect to the hotspot network 210, it is through using this transceiver 609 that the wireless device may detect internet access redirection.

The wireless device 600 includes a display 618 for displaying messages, menus, call related information dialed by the user, calling party numbers, displaying applications and web pages, etc. A keypad 620 enables dialing digits for voice and/or data calls as well as generating selection inputs, for example, as may be keyed in by the user based on a displayed menu or as a cursor control and selection of a highlighted item on a displayed screen. The display 618 and keypad 620 are the physical elements providing a textual or graphical user interface. In addition to normal telephone and data communication related input/output, these elements also may be used for display of menus and other information to the user and user input of selections, if needed during a system selection or login operation or during a software download operation. Various combinations of the keypad 620, display 618, microphone 602 and speaker 604 may be used as the physical input output elements of the GUI, for multimedia (e.g. audio and/or video) communications. Other user interface elements may be used, such as a stylus and touch sensitive display screen, as in a PDA or smart phone.

A microprocessor 612 serves as a programmable controller for the wireless device 600, in that it controls all operations of the wireless device 600 in accord with programming that it executes, for all normal operations, and for operations involved in automatically detecting internet redirection. In the example, the wireless device 600 includes flash type program memory 614, for storage of various "software" or "firmware" program routines and mobile configuration settings. The wireless device 600 may also include a non-volatile random access memory (RAM) 616 for a working data processing memory. Of course, other storage devices or configurations may be added to or substituted for those in the example. In a present implementation, the flash type program memory 614 stores firmware such as a boot routine, device driver software, an operating system, call processing software and vocoder control software, and any of a wide variety of other applications, such as client browser software and short message service software. The memories 614 and 616 also store various data, such as telephone numbers and server addresses, downloaded data such as multimedia content, and various data input by the user. Programming stored in the flash type program memory 614, sometimes referred to as "firmware," is loaded into and executed by the microprocessor 612. The executable programming stored in the flash memory 614 may include automatic internet redirection detection programming 622, to enable the device 600 to implement procedures like those discussed above relative to FIG. 1 and FIGS. 3-5.

Figure 7:
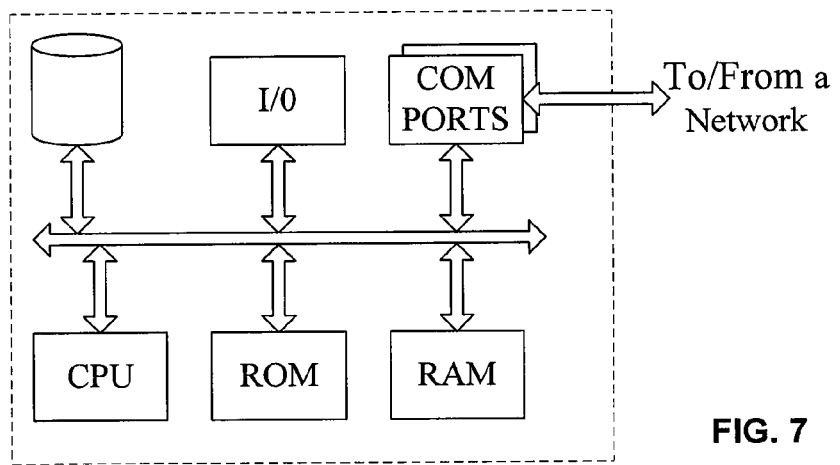
FIG. 7 is a simplified functional block diagram of a computer that may be configured as a server.

FIG. 7 provides a functional block diagram illustration of a general purpose computer hardware platform. More specifically, FIG. 7 illustrates a network or host computer platform, as may typically be used to implement a server. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage, and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load. The software programming relating to the redirection detection techniques discussed herein may be downloaded and/or updated from a computer platform, for example, from a server (e.g. FIG. 7) or the like communicating with the wireless device (e.g. FIG. 6) via the network (e.g. FIG. 2). Although special purpose devices may be used to support the download functions, such devices also may be implemented using one or more hardware platforms intended to represent a general class of data processing device commonly used to run "server" and/or "client" programming so as to implement the functions discussed above, albeit with an appropriate network connection for data communication.

Hence, aspects of the methods of automatic internet redirection detection outlined above may be embodied in programming. Program aspects of the technology may be thought of as "products" or "articles of manufacture" typically in the form of executable code and/or associated list data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium, or a physical transmission medium. Non-volatile storage media include, for example, optical or magnetic disks, such as any of the storage devices in any computer(s) or the like, such as may be used to implement the information flow control, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions and/or associated list data to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX: ACRONYM LIST

The description above has used a large number of acronyms to refer to various services, messages and system components. Although generally known, use of several of these acronyms is not strictly standardized in the art. For the convenience of the reader, the following list correlates terms to acronyms, as used in the detailed description above.

1xRTT—Single-Carrier Radio Transmission Technology
 BS—Base Station
 CD—Compact Disk
 CDMA—Code Division Multiple Access
 CD-ROM—Compact Disk-Read Only Memory
 CPU—Central Processing Unit
 DNS—Domain Name System
 DVD—Digital Video Disk
 DVD-ROM—Digital Video Disk-Read Only Memory
 EEPROM—Electrically Erasable Programmable Read Only Memory
 EPROM—Erasable Programmable Read Only Memory
 EvDO—Evolution-Data Optimized
 FPLMN—Forbidden PLMN list
 GSM—Global System for Mobile Communications
 GUI—Graphical User Interface
 HTTP—Hyper Text Transfer Protocol
 HTTPS—Hyper Text Transfer Protocol Secure
 IEEE—Institute of Electrical and Electronics Engineers
 IP—Internet Protocol
 LAN—Local Area Network
 LTE—Long Term Evolution
 MS—Mobile Station
 MSC—Mobile Switching Center
 PDA—Personal Digital Assistant
 PROM—Programmable Read Only Memory
 PSTN—Public Switched Telephone Network
 RAM—Random Access Memory
 RAN—Radio Access Network
 RF—Radio Frequency
 ROM—Read Only Memory
 UMTS—Universal Mobile Telecommunications System
 WiMAX—Worldwide Interoperability for Microwave Access
 XCVR—Transceiver

What is claimed is:

1. A method for automatically detecting internet access redirection of a wireless device, comprising the steps of:
   automatically detecting a connection of a wireless device to a wireless hotspot network;
   responsive to the automatic detection of the connection, performing a first type of detecting whether or not the wireless hotspot network implements internet access redirection;
   when the first type of detecting does not detect internet access redirection, performing a second type of detecting whether or not the wireless hotspot network implements internet access redirection; wherein:
   one of the first and second types of detecting comprises detecting domain name system redirection; and
   the other of the first and second types of detecting comprises detecting HTTP redirection.

2. The method of claim 1, wherein the detecting of domain name system redirection comprises steps of:
   requesting a resolution of a first domain name to a first internet protocol address via the wireless hotspot network, wherein the first domain name is known to resolve to an internet protocol address which ordinarily reverse resolves back to the first domain name;
   responsive to the step of requesting the resolution, receiving the first internet protocol address resolved from the first domain name via the wireless hotspot network;
   responsive to the step of receiving the first internet protocol address, requesting reverse resolution of the first internet protocol address to a second domain name via the wireless hotspot network;
   responsive to the step of requesting the reverse resolution, receiving the second domain name reverse resolved from the first internet protocol address via the wireless hotspot network; and
   responsive to the step of receiving the second domain name, if there is a discrepancy between the first domain name and the second domain name, determining that the wireless hotspot network is using domain name system redirection to redirect internet access of the wireless device.

3. The method of claim 1, wherein the detecting of HTTP redirection comprises steps of:
   sending a HTTP request for a web page via the wireless hotspot network, where the web page is known not to implement redirection;
   responsive to the request for the web page, receiving a HTTP response via the wireless hotspot network; and responsive to the step of receiving the HTTP response, if there is a discrepancy between the HTTP response and an expected HTTP response, determining that the wireless hotspot network is using HTTP redirection to redirect internet access of the wireless device.

4. The method of claim 3, wherein:
the step of receiving the HTTP response via the wireless hotspot network comprises receiving a HTTP status code; and
the discrepancy between the HTTP response and the expected HTTP response comprises a discrepancy between the HTTP status code and an expected HTTP status code.

5. The method of claim 4, wherein:
the step of sending the HTTP request via the wireless hotspot network comprises sending an HTTP HEAD request via the wireless hotspot network;
the step of receiving the HTTP response via the wireless hotspot network further comprises receiving HTTP headers via the wireless hotspot network; and
the discrepancy between the HTTP response and the expected HTTP response further comprises a discrepancy between the received HTTP headers and expected HTTP headers for the web page.

6. The method of claim 4, wherein:
the step of sending the HTTP request via the wireless hotspot network comprises sending an HTTP GET request via the wireless hotspot network;
the step of receiving the HTTP response via the wireless hotspot network further comprises receiving an HTTP GET via the wireless hotspot network; and
the discrepancy between the HTTP response and the expected HTTP response further comprises a discrepancy between the response to HTTP GET and an expected response to HTTP GET for the web page.

7. The method of claim 1, further comprising steps of:
upon determining that the wireless hotspot network is redirecting internet access of the wireless device, opening a web browser on the wireless device to allow authentication to the wireless hotspot network;
generating an alert to attract attention of a user of the wireless device; and
responsive to a user input, submitting information needed to obtain internet access service from the wireless hotspot network, via HTTP.

8. The method of claim 1, further comprising a step of:
upon determining that the wireless hotspot network is redirecting internet access of the wireless device, automatically submitting via HTTP information needed to obtain internet access service from the wireless hotspot network.

9. A wireless device comprising:
a wireless transceiver;
a programmable controller coupled to the wireless transceiver;
a storage medium coupled to the controller; and
programming stored in the medium, wherein execution of the programming by the controller causes the controller to operate the wireless device to perform functions comprising:
automatically detecting a connection of a wireless device to a wireless hotspot network;
responsive to the automatic detection of the connection, performing a first type of detecting whether or not the wireless hotspot network implements internet access redirection;
when the first of detecting does not detect Internet access redirection, performing a second type of detecting whether or not the wireless hotspot network implements internet access redirection: wherein:
one of the first and second types of detecting comprises detecting domain name system redirection; and
the other of the first and second types of detecting comprises detecting HTTP redirection.

10. An article of manufacture comprising: a non-transitory machine readable storage medium; and programming embodied in the non-transitory machine readable storage medium, wherein execution of the programming causes a wireless device to perform functions for automatically detecting internet access redirection, the functions comprising:
automatically detecting a connection of a wireless device to a wireless hotspot network; responsive to the automatic detection of the connection, performing a first type of detecting whether or not the wireless hotspot network implements internet access redirection; when the first type of detecting does not detect internet access redirection, performing a second type of detecting whether or not the wireless hotspot network implements internet access redirection; wherein: one of the first and second types of detecting comprises detecting domain name system redirection; and the other of the first and second types of detecting comprises detecting HTTP redirection.

11. The wireless device of claim 9, wherein the detecting of domain name system redirection comprises functions of:
requesting a resolution of a first domain name to a first internet protocol address via the wireless hotspot network, wherein the first domain name is known to resolve to an internet protocol address which ordinarily reverse resolves back to the first domain name;
responsive to requesting the resolution, receiving the first internet protocol address resolved from the first domain name via the wireless hotspot network;
responsive to receiving the first internet protocol address, requesting reverse resolution of the first internet protocol address to a second domain name via the wireless hotspot network;
responsive to requesting the reverse resolution, receiving the second domain name reverse resolved from the first internet protocol address via the wireless hotspot network; and
responsive to receiving the second domain name, if there is a discrepancy between the first domain name and the second domain name, determining that the wireless hotspot network is using domain name system redirection to redirect internet access of the wireless device.

12. The wireless device of claim 9, wherein the detecting of HTTP redirection comprises functions of:
sending a HTTP request for a web page via the wireless hotspot network, where the web page is known not to implement redirection;
responsive to the request for the web page, receiving a HTTP response via the wireless hotspot network; and
responsive to receiving the HTTP response, if there is a discrepancy between the HTTP response and an expected HTTP response, determining that the wireless hotspot network is using HTTP redirection to redirect internet access of the wireless device.

13. The wireless device of claim 12, wherein:
the function of receiving the HTTP response via the wireless hotspot network comprises receiving a HTTP status code; and the discrepancy between the HTTP response and the expected HTTP response comprises a discrepancy between the HTTP status code and an expected HTTP status code.

14. The wireless device of claim 13, wherein:
the function of sending the HTTP request via the wireless hotspot network comprises sending an HTTP HEAD request via the wireless hotspot network;
the function of receiving the HTTP response via the wireless hotspot network further comprises receiving HTTP headers via the wireless hotspot network; and
the discrepancy between the HTTP response and the expected HTTP response further comprises a discrepancy between the received HTTP headers and expected HTTP headers for the web page.

15. The wireless device of claim 13, wherein:
the function of sending the HTTP request via the wireless hotspot network comprises sending an HTTP GET request via the wireless hotspot network;
the function of receiving the HTTP response via the wireless hotspot network further comprises receiving an HTTP GET via the wireless hotspot network; and
the discrepancy between the HTTP response and the expected HTTP response further comprises a discrepancy between the response to HTTP GET and an expected response to HTTP GET for the web page.

16. The wireless device of claim 9, wherein the functions performed by the wireless device upon controller execution of the programming further comprise: upon determining that the wireless hotspot network is redirecting internet access of the wireless device, opening a web browser on the wireless device to allow authentication to the wireless hotspot network; generating an alert to attract attention of a user of the wireless device; and responsive to a user input, submitting information needed to obtain internet access service from the wireless hotspot network, via HTTP.

17. The wireless device of claim 9, wherein the functions preformed by the wireless device upon controller execution of the programming further comprise:
upon determining that the wireless hotspot network is redirecting internet access of the wireless device, automatically submitting via HTTP information needed to obtain internet access service from the wireless hotspot network.

18. The article of claim 10, wherein the detecting of domain name system redirection comprises functions of:
requesting a resolution of a first domain name to a first internet protocol address via the wireless hotspot network, wherein the first domain name is known to resolve to an internet protocol address which ordinarily reverse resolves back to the first domain name;
responsive to requesting the resolution, receiving the first internet protocol address resolved from the first domain name via the wireless hotspot network;
responsive to receiving the first internet protocol address, requesting reverse resolution of the first internet protocol address to a second domain name via the wireless hotspot network;
responsive to the reverse resolution, receiving the second domain name reverse resolved from the first internet protocol address via the wireless hotspot network; and
responsive to receiving the second domain name, if there is a discrepancy between the first domain name and the second domain name, determining that the wireless hotspot network is using domain name system redirection to redirect internet access of the wireless device.

19. The article of claim 10, wherein the detecting of HTTP redirection comprises functions of:
sending a HTTP request for a web page via the wireless hotspot network, where the web page is known not to implement redirection;
responsive to the request for the web page, receiving a HTTP response via the wireless hotspot network; and
responsive to receiving the HTTP response, if there is a discrepancy between the HTTP response and an expected HTTP response, determining that the wireless hotspot network is using HTTP redirection to redirect internet access of the wireless device.

20. The article of claim 19, wherein:
the function of receiving the HTTP response via the wireless hotspot network comprises receiving a HTTP status code; and
the discrepancy between the HTTP response and the expected HTTP response comprises a discrepancy between the HTTP status code and an expected HTTP status code.

21. The article of claim 20, wherein:
the function of sending the HTTP request via the wireless hotspot network comprises sending an HTTP HEAD request via the wireless hotspot network;
the function of receiving the HTTP response via the wireless hotspot network further comprises receiving HTTP headers via the wireless hotspot network; and
the discrepancy between the HTTP response and the expected HTTP response further comprises a discrepancy between the received HTTP headers and expected HTTP headers for the web page.

22. The article of claim 20, wherein:
the function of sending the HTTP request via the wireless hotspot network comprises sending an HTTP GET request via the wireless hotspot network;
the function of receiving the HTTP response via the wireless hotspot network further comprises receiving an HTTP GET via the wireless hotspot network; and
the discrepancy between the HTTP response and the expected HTTP response further comprises a discrepancy between the response to HTTP GET and an expected response to HTTP GET for the web page.

23. The article of claim 10, wherein the functions performed upon execution of the programming further comprise:
upon determining that the wireless hotspot network is redirecting internet access of the wireless device, opening a web browser on the wireless device to allow authentication to the wireless hotspot network;
generating an alert to attract attention of a user of the wireless device; and
responsive to a user input, submitting information needed to obtain internet access service from the wireless hotspot network, via HTTP.

24. The article of claim 10, wherein the functions performed upon execution of the programming further comprise:
upon determining that the wireless hotspot network is redirecting internet access of the wireless device, automatically submitting via HTTP information needed to obtain internet access service from the wireless hotspot network.

* * * * *